(12) United States Patent
Lundy

(10) Patent No.: US 9,475,106 B2
(45) Date of Patent: Oct. 25, 2016

(54) IN-SITU SUBSURFACE DECONTAMINATION OF SODIC SOIL, CLAY AND GROUND WATER

(76) Inventor: William L. Lundy, Oak Forest, IL (US)

( * ) Notice: Subject to any disclaimer, the term of this patent is extended or adjusted under 35 U.S.C. 154(b) by 728 days.

(21) Appl. No.: 13/469,492

(22) Filed: May 11, 2012

(65) Prior Publication Data

US 2012/0285891 A1 Nov. 15, 2012

Related U.S. Application Data

(60) Provisional application No. 61/485,115, filed on May 11, 2011.

(51) Int. Cl.
| | |
|---|---|
| *C02F 1/66* | (2006.01) |
| *C02F 1/72* | (2006.01) |
| *C02F 9/00* | (2006.01) |
| *B09C 1/08* | (2006.01) |
| *B09C 1/00* | (2006.01) |

(Continued)

(52) U.S. Cl.
CPC ............ *B09C 1/002* (2013.01); *B09C 1/08* (2013.01); *C02F 1/66* (2013.01); *C02F 1/683* (2013.01); *C02F 1/722* (2013.01); *C02F 1/725* (2013.01); *C02F 9/00* (2013.01); *C02F 2101/36* (2013.01); *C02F 2103/06* (2013.01); *C02F 2305/023* (2013.01); *C02F 2305/026* (2013.01)

(58) Field of Classification Search
CPC ........... B09C 1/08; B09C 1/002; C02F 1/66; C02F 1/683; C02F 1/722; C02F 1/725; C02F 2101/36; C02F 2103/06; C02F 2305/02; C02F 2305/023; C02F 2305/026

USPC .................................................... 210/747.8
See application file for complete search history.

(56) References Cited

U.S. PATENT DOCUMENTS

| | | | |
|---|---|---|---|
| 4,294,703 A | 10/1981 | Wilms et al. | |
| 4,321,143 A | 3/1982 | Wilms et al. | |

(Continued)

FOREIGN PATENT DOCUMENTS

| | | |
|---|---|---|
| CA | 2551943 | 1/2008 |
| GB | 2338476 A | 12/1999 |

OTHER PUBLICATIONS

Irrigation and Soil Salinity, N.T. Singh (2005), p. 284 attached.*

(Continued)

*Primary Examiner* — Lucas Stelling
(74) *Attorney, Agent, or Firm* — Greenberg Traurig, LLP

(57) ABSTRACT

A method of decontaminating soil and ground water containing organic contaminants and metal compounds. It comprises the steps of first treating such soils and ground water with an effective amount an aqueous solution containing a peroxide and a water soluble chelating agent for a time sufficient to have the water soluble chelating agent chelate at least one of the metals of the metal compounds present in the soil and ground water. Next, the chelated metals are brought into contact with the peroxide to catalytically convert the peroxide to an oxidizing agent and hydroxyl ion. The hydroxyl ion converts the halogenated organic compound into environmentally safe, non-toxic compounds. Gases that are produced from this reaction, and from the oxidation of organic compounds, are used to diffuse solution into the soil to chelate calcium and magnesium, thereby causing the sodium to be dislodged from the soil and reduce sodicity in the soil.

14 Claims, 1 Drawing Sheet

(51) Int. Cl.
*C02F 1/68* (2006.01)
*C02F 101/36* (2006.01)
*C02F 103/06* (2006.01)

(56) References Cited

U.S. PATENT DOCUMENTS

| | | |
|---|---|---|
| 4,370,241 A | 1/1983 | Junkermann et al. |
| 4,588,506 A | 5/1986 | Raymond et al. |
| 4,591,443 A | 5/1986 | Brown et al. |
| 4,604,214 A | 8/1986 | Carr et al. |
| 4,724,084 A | 2/1988 | Pahmeier et al. |
| 4,804,480 A | 2/1989 | Jayawant |
| 5,018,576 A | 5/1991 | Udell et al. |
| 5,043,080 A | 8/1991 | Cater et al. |
| 5,264,018 A | 11/1993 | Koenigsberg |
| 5,266,214 A | 11/1993 | Safarzedeh-Amiri |
| 5,286,141 A | 2/1994 | Vigneri |
| 5,395,419 A | 3/1995 | Farone et al. |
| 5,415,777 A | 5/1995 | Krempen et al. |
| 5,449,251 A | 9/1995 | Daily et al. |
| 5,520,483 A | 5/1996 | Vigneri |
| 5,525,008 A | 6/1996 | Wilson |
| 5,564,105 A | 10/1996 | Alvino et al. |
| 5,587,324 A | 12/1996 | Roy et al. |
| 5,610,065 A | 3/1997 | Kelley et al. |
| 5,611,642 A | 3/1997 | Wilson |
| 5,615,974 A | 4/1997 | Land et al. |
| 5,621,845 A | 4/1997 | Bridges et al. |
| 5,653,288 A | 8/1997 | Billings et al. |
| 5,709,505 A | 1/1998 | Williams et al. |
| 5,741,427 A | 4/1998 | Watts et al. |
| 5,789,649 A | 8/1998 | Batchelor et al. |
| 5,879,107 A | 3/1999 | Kiest et al. |
| 5,955,350 A | 9/1999 | Soni et al. |
| 5,967,230 A | 10/1999 | Cooper et al. |
| 5,976,348 A | 11/1999 | Pugh |
| 6,158,924 A | 12/2000 | Athens et al. |
| 6,160,194 A | 12/2000 | Pigatello |
| 6,210,078 B1 | 4/2001 | Redwine et al. |
| 6,268,205 B1 | 7/2001 | Kiest et al. |
| 6,356,830 B1 | 3/2002 | Adamchuck et al. |
| 6,387,278 B1 | 5/2002 | Leif et al. |
| 6,459,011 B1 | 10/2002 | Tarr et al. |
| 6,623,211 B2 | 9/2003 | Kukor et al. |
| 6,843,618 B2 | 1/2005 | Lundy |
| 6,913,419 B2 | 7/2005 | Shiau |
| 8,231,305 B2 | 7/2012 | Lundy |
| 2002/0110509 A1 | 8/2002 | Lundy |
| 2004/0197150 A1 | 10/2004 | Bruell et al. |
| 2004/0229342 A1 | 11/2004 | Lunde et al. |
| 2007/0012080 A1* | 1/2007 | Ashworth ............ 71/32 |
| 2007/0116524 A1 | 5/2007 | Shiau |
| 2009/0087265 A1 | 4/2009 | Lundy |
| 2010/0018921 A1 | 1/2010 | Ruehr et al. |

OTHER PUBLICATIONS

Site Characterization and Confirmation Testing, British Columbia Ministry of Environment (Jan. 2009), pp. 1-10 attached.*
Canadian Intellectual Property Office, Examiner Requisition of Canadian patent application No. 2,776,666, received Mar. 7, 2013, 4 pages.
ISA/US, International Search Report of PCT Application No. US12/37482, date of mailing of ISR Aug. 3, 2012, 1 page.
The International Bureau of WIPO, International Preliminary Report on Patentability issued on PCT Application No. US12/037482, received Nov. 21, 2013, 7 pages.
Canadian Intellectual Property Office, Office Action issued on Canadian Patent Application No. 2,776,666, received Nov. 26, 2013, 3 pages.
United States Patent and Trademark Office, Office Action Summary on U.S. Appl. No. 10/023,465, mailed Jul. 2, 2003, 7 pgs.
United States Patent and Trademark Office, Office Action Summary on U.S. Appl. No. 10/023,465, mailed Nov. 18, 2003, 8 pgs.
United States Patent and Trademark Office, Office Action Summary on U.S. Appl. No. 12/240,460, mailed Jan. 19, 2012, 6 pgs.
United States Patent and Trademark Office, Office Action Summary on U.S. Appl. No. 12/240,460, mailed Mar. 10, 2011, 7 pgs.
United States Patent and Trademark Office, Office Action Summary on U.S. Appl. No. 12/240,460, mailed Jun. 21, 2011, 9 pgs.
United States Patent and Trademark Office, Office Action Summary on U.S. Appl. No. 12/240,460, mailed Oct. 5, 2011, 8 pgs.
European Patent Office, Supplementary European Search Report issued on European Patent Application No. 12782988.5, received Sep. 22, 2014, 5 pages.
Guy D. Smith, Roy W. Simonson, Guy D. Smith, Walter H. Gardner, Goro Uehara, G. A. Peterson, W. O. Willis, C. W. Robbins, C. W. Robbins, Michael Shannon, John E. Gilley, Donald Fryrear, "Soil," in AccessScience, McGraw-Hill Companies, 2008, www.access-science.com, 32 pgs.
Laurier L. Schramm, "Emulsion," in AccessScience, McGraw-Hill Companies, 2008, www.accessscience.com, 6 pgs.
Zhang, W., et al., 2006, Pretreatment of Coal Gasification Wastewater by Acidification Demulsion, Chinese Journal of Chemical Engineering, vol. 14, Issue 3, 2 pgs.
Ndjou'ou, A. & Cassidy, D. 2006, Surfactant Production Accompanying the Modified Fenton Oxidation of Hydrocarbons in Soil, Chemosphere, vol. 65, Issue 9, 11 pgs.

* cited by examiner

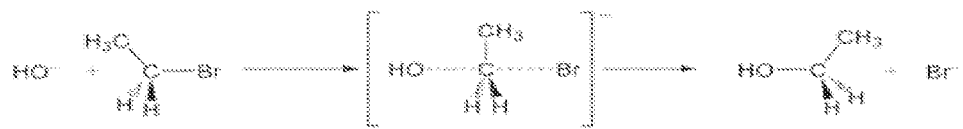

IN-SITU SUBSURFACE DECONTAMINATION OF SODIC SOIL, CLAY AND GROUND WATER

CROSS REFERENCE TO RELATED APPLICATION

The present application for patent claims priority to U.S. Provisional Application No. 61/485,115 entitled "In-Situ Subsurface Decontamination" filed May 11, 2011, and hereby expressly incorporated by reference herein.

BACKGROUND

1. Field of the Invention

The present invention relates to the chemical decontamination of contaminants in soil and groundwater in in-situ and ex-situ environments.

2. Description of the Prior Art

Conventional in-situ treatment technologies for cleaning contaminated subsurface media use injection ports or a combination of injection and extraction ports to deliver reagents and to extract reaction byproducts and contaminants. In-situ chemical oxidation or reduction requires the delivery of reagents in an aqueous medium. Following gravitation, the aqueous reagent solution administered to the subsurface through fixed injection ports becomes an integral part of the groundwater. The volume of contaminated subsurface media in the unsaturated zone above the groundwater table that is affected by the reagent solution is limited to the annular space of the injection ports. Within the groundwater, the reagent solution follows the natural or induced hydraulic gradient. The oxidizing and nucleophilic reagent solution follows preferred pathways, due to physical and chemical heterogeneities of subsurface media. Physical heterogeneities include variability in hydraulic conductivity caused by material changes—for example, clay versus sand versus gravel soils versus fractured bedrock. Mineral surfaces are hydrophilic. The hydrophilic properties are altered by sorption of organic compounds such as natural soil organic matter and organic contaminants that contain both hydrophilic and hydrophobic moieties.

The physical limitations of conventional in-situ delivery systems and the physical chemical heterogeneities of subsurface media limit the effectiveness of oxidizing reagent solutions in making contact with contaminants. Moreover, the oxidizing reagents that are typically utilized in in-situ chemical oxidation systems, e.g. liquid hydrogen peroxide, sodium or potassium permanganate, sodium percarbonate, sodium persulfate, etc., are unstable and/or short-lived with the monovalent sodium or potassium cations negatively affecting site soil by causing soils to become sodic.

Consumption of oxidant by matrix constituents typically exceeds the oxidant consumption by contaminants. To overcome these limitations, large volumes of highly concentrated reagent solutions are typically administered to the contaminated subsurface media. The introduction of highly concentrated and reactive solutions that contain non-specific oxidizing and/or reducing agents poses problems with respect to controlling the progress and the heat of these reactions.

In-situ oxidation systems are known that chemically oxidize organic contaminants to environmentally safe and non-toxic constituents. One such system is a reaction named after its discoverer, H. J. H. Fenton (1894). In this reaction, the oxidizing agent, hydrogen peroxide, is reacted with a metallic salt to generate free radicals with a higher oxidation potential than hydrogen peroxide. The free radicals react with organic compounds to either completely decompose them to carbon dioxide and water or to convert them to water soluble and biologically degradable compounds. A drawback to this process is that the catalytic decomposition of hydrogen peroxide and oxidation of organic compounds by radicals are both exothermic reactions.

A number of patents teach the art of treating contaminants with Fenton-type chemical systems in in-situ environments. The patents by Brown et al., U.S. Pat. No. 4,591,443, Vigneri, U.S. Pat. No. 5,520,483, Wilson, U.S. Pat. No. 5,611,642, Kelly et al., U.S. Pat. No. 5,610,065, and Cooper et al., U.S. Pat. No. 5,967,230, teach the introduction of liquid hydrogen peroxide and a metal catalyst, Fenton's Reagent, such as an iron salt, into the subsurface. Watts et al., U.S. Pat. No. 5,741,427, teaches the injection of a chelated metal catalyst for use in an in-situ chemical oxidation. All of the above cited art adds a metal catalyst into the subsurface. In addition, the processes described in the above cited art include either the co-injection or the sequential introduction of reagents, where the oxidizing agent is added either before or after the metal catalyst. Finally, all of the prior art teaches the necessity of introducing both the oxidizer and the metal catalyst together or separately into the subsurface to facilitate the oxidation of contaminants.

Conventionally, a solution does not exist whereby the use of metal catalyzed peroxides to oxidize underground contaminants is simplified, more controllable, and produces superior results without large amounts of exothermic heat being generated.

It should also be pointed out that the majority of sites are contaminated with multiple types of contaminants. Organic contaminants generally fall into several categories. These include contaminants composed of hydrogen and carbon atoms and are generally referred to as hydrocarbons. A second large cross section of contaminants are composed of hydrogen, carbon and halogen atoms and are known as halogenated compounds. This latter group of compounds is generally more recalcitrant than hydrocarbons.

The most popular methods of remediating halogenated compounds are the application of sodium or potassium permanganate, sodium persulfate, anaerobic reductive dechlorination and the application of nanoscale iron. While popular, these methods have serious complications that make them risky and generally require a long period of time if they are successful at all. Biological reductive dechlorination is dependent upon in-situ factors that will allow microbial proliferation. One of the most serious drawbacks to this technique is that it will not proceed where the concentrations of contaminants are in excess of the toxic threshold of the microbial community. Thus, it is not applicable to high concentrations of contaminants or conditions where free phase product is present. Similarly, although the application of nanoscale iron is not dependent upon biological factors, it is a solid suspension and thus, extremely difficult if not impossible to inject in heavy soils such as hard clay. Therefore, the most popular method of application is trenching, which is expensive and requires the employment of heavy equipment and opening the soil matrix, thereby exposing the contaminant to volatilization to the atmosphere. This practice can produce conditions unsafe for inhalation by site workers. Permanganate salts will successfully mitigate halogenated contaminants, but halogenated compounds are almost always co-contaminants of hydrocarbon compounds that cause permanganate to precipitate as manganese dioxide, thereby causing cessation of the oxidation reaction.

Disposing of produced water or brine by surface discharging was once a common practice by U.S. oil and natural gas producers. This has resulted in extensive damage to the environment in the form of brine scars which are incapable of supporting plant life. Remediation of a brine scar typically involves the removal of salt from the surface layers of soil. However, salt located in deeper layers is rarely removed and can migrate vertically to the surface via capillary action, resulting in the re-contamination of a site and negating remediation efforts. Soil cores taken from a number of natural soil pedestals within a brine-contaminated site have revealed that most soils are co-contaminated at most layers with salt (produced brine water) and organics in the form of hydrocarbons.

Where soils are contaminated with brine or salt to the extent that they do not allow plant growth because of high concentrations of sodium, they are referred to a "sodic." Such soils are unsuitable landscaping or site restoration due to two adverse properties. These are:

1) salinity, often expressed in terms of the soil's electrical conductivity (EC), and 2) sodicity, often expressed in terms of the soil's sodium adsorption ratio (SAR).

A significant percentage of oil- or gas-producing sites are adversely affected by salinity and sodicity due to sodium contamination from produced water (salt water extracted with oil or natural gas production). Salinity (high EC) directly affects plant growth by hindering or preventing root uptake of water which must occur against an osmotic pressure gradient. The greater the concentration of dissociated, ionized salts in a soil's pore water, the greater the water's charge-carrying capacity and hence the higher the soil's EC. EC is expressed in units such as deciSiemens per meter (dS/m). Below EC=2 dS/m, soils are considered non-saline, and few plant species are affected, but at salinity levels above 12 dS/m, most plant species cannot grow.

Sodicity (high SAR) can cause soil plasticity, leading to difficulties in soil cultivation and to slow rates of water infiltration and drainage. These effects occur with sodic soils containing much clay, and in soils with naturally-occurring sodic subsoils such as solonietzic soil. SAR values of non-sodic soils are usually less than 1 SAR unit. Sodicity problems typically arise when SAR values exceed 10 units, depending on clay content. The SAR is a measure of the ratio of sodium $[Na^{+1}]$ ions (positively charged cations) in the pore water compared to that of calcium $[Ca^{+2}]$ and magnesium $[Mg^{+2}]$ cations. SAR value is calculated using the equation:

$$SAR = \frac{Na^{+1}}{\sqrt{\frac{Ca^{+2} + Mg^{+2}}{2}}}$$

Cation conc. expressed as $[Na^{+1}]$, $[Ca^{+2}]$, $[Mg^{+2}]$

In the above equation, $[Na^{+1}]$ etc. are cation concentrations in a filtrate of a saturated soil paste. Sodium cations are monovalent (carrying a single positive charge) whereas calcium and magnesium cations are divalent (having two positive charges). In sodic soils, the SAR is correlated with the percentage of cation exchange sites, on clay and organic matter, occupied by sodium cations. As a result of these adverse effects, environmental guidelines are in place regulating permitted levels of EC and SAR in soil and subsoil matrices.

Conventional remedies for mitigation of sodic soils include applications of calcium and/or magnesium compounds such as calcium sulfate (gypsum), calcium nitrate, calcium chloride, and magnesium sulfate (Epsom salts) which dissipate in soil pore water to yield calcium and magnesium cations that are dissociated in solution from attendant negatively charged anions. Alternatively, acids (including both mineral and organic acid) have been applied which reacts with calcium or magnesium carbonates (present in alkaline soil) to release calcium and magnesium cations in-situ. The calcium and magnesium compounds are applied to increase the concentration of calcium and magnesium cations in the soil's pore water thus, restoring the ability of the soil (particularly clay soils) to transport water. As the water permeates the soil, it flushes out sodium ions, thereby lowering the soil's SAR value.

Traditionally, the application of calcium and/or magnesium compounds have been applied to the surface of brine affected soils with some mechanical mixing to incorporate the admixture into shallow soils. Although this method proved somewhat successful for agricultural operations, it was inappropriate for application under oil and natural gas production conditions where brine (produced water) was co-mingled with fuel components at much deeper levels. Also, the carbonate and sulfate salts of calcium and magnesium had no effect toward the remediation of the fuel components. The addition of chelating agents to disassociate calcium and magnesium carbonates and bring the cations into solution has been attempted; however, the practice has no effect on hydrocarbon contaminants, is expensive and has proven less than marginally successful under the broad spectrum of field applications.

Thus, a conventional process does not exist that remediates both the organic contaminants and the sodic (SAR) conditions with the application of a single solution that is applied through the use of methods sufficient to contact these co-contaminants located at deeper as well as shallow levels.

SUMMARY OF THE INVENTION

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

An embodiment of the present invention is directed to an improved method of decontaminating soil and groundwater containing halogenated organic contaminants. It includes the steps of first treating the soils and ground waters with an with an effective amount an aqueous solution containing an alkaline buffering agent, a peroxide and a water-soluble chelating agent for a time sufficient to have the water-soluble chelating agent chelate at least one of the metals of the metal compounds present in the soil and ground water. Next, the chelated metals are reacted with the peroxide to catalytically convert the peroxide to an oxidizing agent and hydroxide ions. The halogenated organic contaminants in the soil and ground water are contacted with the hydroxide ions to reduce the halogenated organic contaminants to environmentally safe, non-toxic compounds.

Another embodiment of the present invention is directed to an improved method of treating sodic soil. It includes the steps of first treating the soils and ground waters with an with an effective amount an aqueous solution containing calcium and/or magnesium peroxide and a water-soluble chelating agent for a time sufficient to have the water-soluble chelating agent chelate at least one of the metals of the metal compounds present in the soil and ground water. Next, the calcium and/or magnesium peroxide are reacted with water to produce calcium and/or magnesium cations, which are then diffused into the soil through gases, which aide in penetrating the soil matrix. Finally, the sodic soils and ground waters are contacted with the chelating agent to chelate the calcium and magnesium cations, which has the effect of dislodging sodium from the soil into the solution.

Another embodiment of the invention is directed to an improved method of decontaminating soil and groundwater containing halogenated organic contaminants, non-halogenated organic contaminants, and metal compounds, in sodic soil. It includes the steps of first treating such soils and ground waters with an with an effective amount an aqueous solution containing a peroxide and a water-soluble chelating agent for a time sufficient to have the water-soluble chelating agent chelate at least one of the metals of the metal compounds present in the soil and ground water. Next, the chelated metals are reacted with the peroxide to catalytically convert the peroxide to an oxidizing agent and hydroxide ions. The halogenated organic contaminants in the soil and ground water are then contacted with the hydroxide ions to reduce the halogenated organic contaminants to environmentally safe, non-toxic compounds, while leaving the oxidizing agent to oxidize other organic contaminants. Finally, the sodic soils and ground waters are contacted with the chelating agent to chelate the calcium and magnesium cations, which has the effect of dislodging sodium from the soil into the solution.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 1 is an example of a nucleophilic substitution reaction.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and compounds have not been described in detail as not to unnecessarily obscure aspects of the present invention.

Generally speaking, various embodiments provide methods to treat soils and/or ground waters that are contaminated with halogenated organic compounds alone or in combination with other organic compounds. Other embodiments are used to treat sodic soils. These methods may be used in combination with each other, and in fact enjoy a beneficial effect of being practiced simultaneously. Gases that are produced in the treatment of halogenated and other organic compounds may be utilized to deliver additional reagent to reach more contaminants, and to penetrate and diffuse reagent into sodic soils.

A method according to an embodiment of the present invention involves a nucleophilic substitution reaction whereby halogenated organic contaminants and other organic contaminants are chemically converted to environmentally friendly compounds, such as alcohols. Other organic contaminants are chemically oxidized by reaction with hydrogen peroxide and metallic peroxides in the presence of a metal catalyst. The method includes harnessing the abundance of metals in soil and bedrock as source of the metal catalysts. The method may involve at least one and preferably a plurality of injection sites whereby a single aqueous reagent fluid is injected into the subsurface to facilitate the oxidation of contaminants. The term, "aqueous solution" as used herein and in the claims includes aqueous finely divided suspensions and slurries. The in-situ subsurface media affected by the present embodiment includes the subsurface unsaturated zone, the capillary fringe above the groundwater table, and the water-saturated zone, including soil and groundwater in fractured bedrock.

In one embodiment of the invention, an aqueous oxidizing reagent formulation is delivered to an in-situ subsurface media, soil and groundwater contaminated with halogenated organic compounds. The formulation is comprised of liquid and solid peroxides and phosphate salts, as well as polyaminopolycarboxylate chelates. The chelates in the reagent fluid extract naturally occurring metals from soil and bedrock as a source of metal catalysts necessary to convert the peroxides to oxidizing agents and hydroxide ions. The hydroxide ions convert the halogenated organic compounds to environmentally safe and non-toxic compounds through nucleophilic substitution. The oxidizing agents convert the other organic contaminants to (other) environmentally safe and non-toxic compounds. The methodology of successfully compounding chelating agents into the oxidizer reagent formulation obviates the need for a second formulation containing the metal catalysts. Because the method controls the activity of the chelates and the oxidizers, the rate of the oxidation reaction is controlled, thereby minimizing or eliminating the temperature rise produced by prior technologies. Also, the present embodiment minimizes any increase in the temperature of the groundwater and/or soil moisture, and the volatilization of contaminants in the in situ proximity of the oxidation reaction is also minimized. Also, amphiphilic by products (hydroxylated organic compounds) produced by the oxidation of organic contaminants produce a marked decrease in the surface tension of groundwater thereby, further reducing the potential for the volatilization of contaminants.

The contaminants converted by nucleophilic substitution include, but are not limited to, conventional chlorinated solvents, vinyl chloride, dichloroethene, polychlorinated biphenyls, halogenated herbicides and pesticides, dioxins, pentachlorophenol, etc. The contaminants converted by chemical oxidation include, inter alia, aliphatic hydrocarbons, such as gasoline, diesel fuel, olefinic hydrocarbons, chlorinated and polychlorinated hydrocarbons, dry cleaning and industrial solvents, wood treating agents, herbicides, pesticides, polychlorinated biphenyls, and aromatic and polynuclear aromatic hydrocarbons, oxygenated hydrocarbons, phenol and phenol derivatives, nitrogenous hydrocarbons, or mixtures thereof. While halogenated compounds may be also be treated by oxidation, $S_N$ substitution is believed to be the predominant mechanism.

The peroxides that are administered to the subsurface media in an aqueous fluid include the peroxides: hydrogen peroxide, magnesium peroxide, and calcium peroxide. The buffering agent, which is desirably a water-soluble phosphate, may be selected from the alkali metal phosphates, potassium phosphate being exemplary, ammonium phosphate, urea phosphate, and combinations thereof. The preferred chelates are exemplified by the water-soluable aminopolycarboxylate chelates ethylenediaminetetraacetic acid (EDTA), diethylenetriaminepentaacetic acid (DTPA), ethylenediamine-di(o-hydroxyphenylacetic acid) (EDDHA), polyaspartic acid (PASA), their salts and/or combinations thereof. These chelating agents can also be used as the pH buffering agent, instead of or in combination with the phosphate buffering agents discussed above.

The aqueous solution of the peroxide and a water-soluble chelating agent, when adjusted to achieve the pH levels described, most often requires the presence of an alkaline buffering agent. Preferred alkaline buffering agents are alkaline phosphate or ammonia phosphate salts and urea phosphate. While urea phosphate has a strong acid component that may lower the pH, it may be used because it has additional benefits when followed by biological treatment: urea offers a nitrogen source and phosphate provides nutrients for biological organisms.

In the above-described embodiments, the aqueous solutions are injected into at least one location, and preferably multiple locations. Blends of chelating agents and peroxides may be used as well as single compounds of these groups of compounds.

The peroxides are catalyzed with the metal present to form an oxidizing agent (hydroxyl radicals) and a hydroxyl ion. The hydroxyl ion is used in nucleophilic substitution to convert halogenated organic compounds to environmentally friendly chemicals such as alcohols. The oxidizing agent is used to oxidize organic compounds.

Phosphates as well as phosphoric acid and its salts are used to adjust the pH and to inhibit decomposition of hydrogen peroxide by free iron or other divalent metals, such as copper or nickel in the aqueous reagent fluid.

Various embodiments utilize the liquid hydrogen peroxide liberated by the dissolution of solid peroxides, which includes calcium peroxide and/or magnesium peroxide. In one embodiment, the preferred solid calcium and magnesium peroxide employed in this invention react with water according to the following reactions:

$$CaO_2 + 2H_2O \rightarrow Ca^{+2} + 2(OH)^- + H_2O_2 \quad (1)$$

$$MgO_2 + 2H_2O \rightarrow Mg^{+2} + 2(OH)^- + H_2O_2 \quad (2)$$

$$Fe^{+2} + H_2O_2 \rightarrow [OH]\cdot + (OH)^- \quad (3)$$

$$Fe^{+3} + H_2O_2 \rightarrow [OOH]\cdot + (OH)^- \quad (4)$$

The hydrogen peroxide that is gradually liberated in reactions (1) and (2) is available for catalytic decomposition. The hydroxides resulting from reactions (1) and (2) dissociate reactions (3) and (4), thereby raising the pH of the solution. The phosphates added to the solution moderate the pH drift. The pH drifts to basic conditions. Basic pHs facilitate the dissolution of suspended EDTA, DTPA, EDDHA and PASA solids.

The Chelating Agents

The synthetic chelating agents that may be employed in embodiments of the present invention include, but are not limited to, the aminopolycarboxylate chelates EDTA, DTPA, EDDHA and PASA. These agents form soluble complexes and chelates with free metal ions, such as divalent iron Fe(II), trivalent iron Fe(III), divalent copper Cu(II), divalent zinc Zn(II), divalent magnesium Mg(II), divalent calcium Ca(II) and trivalent aluminum (III) in solution. The chelating agents dissociate exchangeable cations attached to mineral surfaces and also dissolve minerals. The iron-containing minerals that are dissolved by chelates include, inter alia, goethite, hematite, magnetite, ferrihydrite, and siderite.

A combination that gives good results is a blend of ethylenediaminetetraacetic acid with diethylenetriaminepentaacetic acid. These compounds have greater solubility in the form of their alkali metal or ammonia salts.

The metal catalyst preferably is iron. Iron is almost universally present in nearly all soils and ground waters. The chelated iron is effective in the practice of the invention in either of its valency states, including mixtures thereof. Other catalytically active metal compounds, such as those of copper or nickel, if present in the soil, produce satisfactory results. It is, of course, understood that the metal compound present in the soil or groundwater must be capable of catalyzing the reactions described in its chelated form.

The effective complexation of the iron catalyst is strongly dependent on solution pH and the presence of Ca(II) and, to a lesser degree, Mg(II) (water hardness), which typically occurs at higher concentrations than Fe in natural waters. In an embodiment, the proportions of EDTA, DTPA, EDDHA and PASA employed depend upon the water hardness and the leachability of Ca(II), Mg(II), and Fe(II)/Fe(III) from soils and bedrock. Two solution conditions are known to decrease the stability of Fe-EDTA and Fe-DTPA, i.e., their tendency to form soluble Fe-chelates. In basic solutions, the solubility of iron is controlled by amorphous ferric iron hydroxide, which precipitates and diminishes the stability of Fe-EDTA and Fe-DTPA complexes. Calcium at high solution concentrations competes with iron for chelates Fe-DTPA, and more so, Fe-EDDHA and PASA chelates are less affected by these solution conditions than Fe-EDTA chelates.

Various embodiments utilize an oxidation reaction, where a chelated metal, preferably chelated iron, catalyzes the decomposition of hydrogen peroxide to yield hydroxyl, perhydroxyl, and superoxide radicals. As such, the reagent fluid should contain only an effective amount of chelation agent to avoid an excessive amount of catalyst from being produced that would cause an undesirable increase in the decomposition rate of the peroxide for safety and stability reasons. The soluble Fe-EDTA, Fe-DTPA, Fe-EDDHA and Fe-PASA chelates react with hydrogen peroxide to yield these highly reactive radicals, which, in turn, react with organic compounds.

The rate of oxidation reaction with Fe(II)-aminocarboxylate complexes, including Fe(II)-EDTA, Fe(II)-DTPA, Fe(II)-EDDHA and Fe(II)-PASA complexes, is greater by orders of magnitude than the rate of oxidation reaction with Fe-aquo complexes in solutions with near neutral pH. Fe(II) and Fe(III)-chelates are part of a cycle that decomposes hydrogen peroxide. Hydrogen peroxide oxidizes Fe(II)-chelate to Fe(III)-chelate and reduces Fe(III)-chelate to Fe(II)-chelate.

In aqueous Fenton-type oxidation systems, aliphatic and aromatic compounds and their halogenated derivatives undergo hydroxylation followed by mineralization. Fenton-type oxidation systems have been used to enhance the biological treatability of wastewater and landfill leachate containing various toxic and recalcitrant organic compounds. Fenton-type oxidation systems in soil decompose organic contaminants and also enhance their biological degradation in soil.

Nucleophilic Substitution of Halogens

One method used to produce synthetic alcohols involves the production of intermediate chlorinated carbon compounds. The primary feed stocks for this method of the production of alcohols are olefins and chlorine. Chlorine ($Cl_2$) is used to break the double bonds of olefins, thereby producing chloro-carbons. These chloro-carbons are then reacted using Nucleophilic Substitution ($S_N$) reactions ($S_N1$ or $S_N2$), wherein a hydroxyl ion ($OH^-$) is substituted onto the carbon molecule thus, replacing the chloride ion ($Cl^-$) and forming alcohols. The alcohols are then purified and sold into the merchant market. Although popular prior to in the 1970s, this process has been replaced by the direct catalytic oxidation of olefins under pressure.

In classical chemistry terms, the $S_N$ mechanisms are reduction reactions (not oxidation reactions as is popularly thought) whose reaction rate depends upon the concentration of the substrate (in an embodiment of the present invention, halogenated organic compounds) and the concentration of the hydroxide ion (OH—), and not the hydroxyl radicals ($[OH]^\circ$ and/or $[OOH]^\circ$) that are utilized in oxidation. In the treatment of halogenated contaminants, this mechanism circumvents the chemical oxidation mechanisms and thus, obviates the need for consideration of the effect of oxygen demand from Soil Oxygen Demand (SOD) or Natural Oxygen Demand (NOM) sources.

The $S_N1$ reaction is a substitution reaction in organic chemistry. "$S_N$" stands for nucleophilic substitution and the "1" represents the fact that the rate-determining step is unimolecular. The reaction involves a carbocation intermediate and is commonly seen in reactions of secondary or tertiary alkyl halides under basic conditions. With primary alkyl halides (chlorinated solvents or chloro-alkyl compounds), the alternative $S_N2$ reaction occurs. Among inorganic chemists, the $S_N1$ reaction is often known as the dissociative mechanism.

The $S_N2$ reaction is a type of nucleophilic substitution, where a lone electron pair from a nucleophile (hydroxide ion (OH—) attacks an electron deficient electrophilic (carbon atom) center and bonds to it, expelling another group called a leaving group (halide ion (Cl—)). Thus the incoming group replaces the leaving group in one step. Since two reacting species are involved in the slow, rate-determining step of the reaction, this leads to the name bimolecular nucleophilic substitution, or $S_N2$. Among inorganic chemists, the $S_N2$ reaction is often known as the interchange mechanism. Both these reaction mechanisms can occur under the varying conditions found under in-situ applications.

The reaction most often occurs at an aliphatic carbon center with an electronegative, stable leaving group attached to it—frequently a halide (Cl—) atom. The breaking of the carbon-chlorine C—(Cl—) bond and the formation of the new carbon-hydroxide C—(OH) bond occur simultaneously to form a transition state in which the carbon under nucleophilic (OH—) attack is hybridised. The nucleophile (OH—) attacks the carbon at 180° to the leaving group, since this provides the best overlap between the nucleophile's lone electron pair and the C—Cl— antibonding orbital. The leaving group (Cl—) is then pushed off the opposite side and the product (alcohol) is formed.

In the example of the $S_N2$ reaction depicted in FIG. 1, the attack of OH— (the nucleophile) on a bromoethane (the electrophile) results in ethanol, with bromide ejected as the leaving group. This is the classic example of the nucleophilic substitution reaction. This reaction is a negative free energy reaction and always proceeds to the right thus, producing an alcohol molecule and freeing the halogen ion. Because of this, the reaction is irreversible in nature.

When multiple halogen atoms are attached to a carbon molecule, the reaction proceeds until all halogen atoms have been replaced. Because of this, the reaction is irreversible in nature. When this occurs, the reaction products are usually carbon dioxide, water and halide ions. Thus, the $S_N$ reaction does not produce hazardous by-products of anaerobic dechlorination, such as vinyl chloride or dichloroethylene (DCE).

As described above, various embodiments of the present invention utilize an oxidation reaction, where a chelated metal, preferably chelated iron, catalyzes the decomposition of hydrogen peroxide to yield hydroxyl and perhydroxyl radicals, superoxide and hydroxide ions. The hydroxide ions are exploited in a nucleophilic substitution reaction to convert halogenated organic compounds to alcohols with the halogens converted to free halide ions. The alcohols are highly biodegradable under aerobic conditions. The ultimate result of the process is the conversion of the halogenated organic compound to carbon dioxide. The halide ion is disbursed in the protic solvent (water).

Finally, the calcium and magnesium cations, produced as a result of hydrolyzing the calcium and magnesium peroxide, are chelated with the chelating agent, to hold the calcium and magnesium cations in solution. The additional presence of calcium and magnesium cations in the solution lowers the sodicity of the soil by increasing the ratio of calcium and magnesium cations to sodium cations thus, restoring the ability of the soil to transport water thereby allowing sodium to flush out of the impacted soil. The lower sodicity allows the soil to again support tree and plant life.

It should be noted that $S_N$ reactions are dependant only on the concentrations of the substrate (chlorinated solvent) and the nucleophile (hydroxide ion). Oxygen demand considered critical under some oxidation chemistry mechanisms, does not enter into this mechanism and, thus, is irrelevant to the success of this remedial process. It can therefore be concluded that, although the process produces hydroxyl radicals as well as hydroxide ions, the two functions are mutually exclusive. The hydroxyl radicals oxidize hydrocarbons by employing an addition reaction, whereby the radical displaces a proton, thereby adding a hydroxide group to a carbon atom. These oxidation reactions produce an alcohol from a hydrocarbon substrate. Conversely, the $S_N$ reaction exploits the hydroxide ion $(OH)^-$ (the nucleophile) which displaces the halogen ion ($Cl^-$), thereby producing an alcohol from a chlorinated substrate. Both reactions are abiotic and are examples of classic oxidation and reduction reactions proceeding at the same time and in the same moiety.

Using this process, mixed plumes of contaminants (hydrocarbons and halogenated organic compounds) can be remediated at the same time by the same reagent applied by the same equipment from one injection point (in-situ application). Excavated soil can be remediated by applying (mixing) the reagents to the excavated material. The process is not limited to either application.

The oxidation reactions cause mild off-gassing of carbon dioxide and oxygen. The off-gassing is useful in opening up the soil matrix through the gas expanding into the soil, which increase the surface areas on which the reagent may react. It is also believed that gases aide in diffusing the reagents present in the alkaline aqueous solution into the soil and/or ground water to contact more contaminants. These two mechanisms, acting alone or in tandem are believed to penetrate the soil and/or ground water thereby providing the reagents with additional sites for reaction in the soil and/or ground water. The additional reaction then creates more gases through which the reaction of reagent with contaminants continues, thus extending the penetration of the reactants without additional mechanical means, such as mixing or using more injection points. The off gassing observed during progressive injections is further utilized to delineate the vertical and horizontal extent of contamination in subsurface media and to make adjustments to the application of reagent fluid.

The rates of the oxidation reactions are controlled by two mechanisms. Because of the gradual dissolution of solid peroxides, the concentration of hydrogen peroxide in the subsurface media remains sufficiently low. The dissolution of the peroxides increases the pH, which, in turn, leads to the dissolution of the acidic chelates required for the formation of the chelated iron catalyst. The combined effect of the two mechanisms minimizes or eliminates the evolution of excessive heat from oxidation reactions. As such, the temperature of the ground water/subsurface media typically rises no more than 10.0 degrees F., preferably no more than 5.0 degrees F., and most preferably, no more than 1.0 degree F. Solution Concentration and Application to Soil and Ground Waters In a preferred embodiment of the invention, the reagent fluid is comprised of water, one or more peroxides, one or more chelating agents, and one or more phosphate buffers.

The peroxides hydrogen peroxide and/or calcium peroxide are preferred, although blends including magnesium peroxide and sodium percarbonate may also be used. The peroxide is present in the aqueous solution in an amount ranging from about 0.6 to about 4.5 Moles/Liter. In one embodiment, hydrogen peroxide is applied in concentrations of 0-8%, or 0-2.5 Molar, and calcium peroxide from 1-8%, or 0.14-3.0 Molar.

The chelating agents are one or more combinations of the aminopolycarboxylate chelates ethylenediaminetetraacetic acid (EDTA), diethylenetriaminepentaacetic acid (DTPA), ethylenediamine-di(o-hydroxyphenylacetic acid) (EDDHA), polyaspartic acid (PASA) and their salts and combinations thereof, and are sprayed and/or injected into soil and groundwater. In one embodiment, the amount of chelating used is within the range of from about 0.03 to about 1.5 Moles/Liter, or 0.25-0.50 wt. % of total peroxides. The proportions of aminopolycarboxylate chelates are determined based on site-specific leachability of calcium, magnesium, iron, nickel, and copper naturally occurring in the soil and bedrock, groundwater alkalinity, and soil pH. The concentration of total aminopolycarboxylate chelate employed typically ranges from about 0.03 Moles/Liter to about 3.25 Moles/Liter of reagent fluid, or roughly 0.25-0.50% of the total weight of peroxides that are used. More or less may be used for more extreme subsurface media conditions.

The phosphate buffer is one or more salts of potassium and ammonia phosphate and urea phosphate. The pH of the solution of peroxide and chelating agent should be adjusted to at least 7.0. A beneficial range is pH between 7.0 and 10.0. A preferred range is pH between 7.5 and 9.0. Most preferred is a pH of 8.0-8.5. A mixture of mono-(MAP) or di- (DAP) ammonium phosphate buffers, 10-20% solution, are typically used as the buffers, at ratios of 1:2-2:1, depending on what is required to bring the solution into the desired pH range. A higher amount of MAP is useful when attempting to lower the pH, while a higher amount of DAP is useful when attempting to raise the pH. Furthermore, it has been found that adding 1 lb DAP per 100 gal reagent, can bolster bio-activity when the remediation is followed by biological treatment. The proportion of phosphate salts is contingent on site-specific pH of the groundwater and/or the buffering capacity of the soil.

The individual formulation will vary depending on the contaminants that are at the site, and the media. The total amount of reagent to be applied is calculated by estimates of the amount of contaminants to be remediated. Furthermore, site characterization tools are helpful in determining where within the treatment area the highest concentrations of contaminants are located, and at which depths from the surface. Table 1 below shows various formulations for several embodiments of the invention:

TABLE 1

| Application | hydrogen peroxide | calcium peroxide | chelates (one or blend) wt. % of total peroxides | DAP lbs/100 gal reagent |
|---|---|---|---|---|
| Injections and In-situ Mixing | | | | |
| hydrocarbons, sandy or clay lens soil & ground water | 1-3% | 2-4% | 25% | 0.5-2.0 |
| halogenated contaminants (usually found with hydrocarbons) | 1-3% | 2-6% | 33% | 0.5-2.0 |
| all contaminants in heavy clay or sediments (silty clay) | 1-2% | 2-6% | 50% | 0.5-2.0 |
| All contaminants in Clay or Sediments (Silty Clay) with SAR Excavations | 1-3% | 3-6% | 50% | 0.5-2.0 |
| All contaminants in Clay or Sediments (Silty Clay) | 1-5% | 3-6% | 33% | 0.5-2.0 |

The method according to one embodiment injects a single reagent fluid that contains all of the reagent compounds required for chemical oxidation of contaminants. At least one injection and, preferably, a plurality of closely spaced injections, is/are performed within the contaminated subsurface media to increase the probability of contact between the reagent and the contaminant. Approximately 3-5 gal/cu yard of reagent are used. One advantage of the present invention is to use less reagent than expected, because the resultant $CO_2$ produced from the invention is used to carry additional reagent to through pores in the media. In determining the amount of reagent to use, the porosity of the media should be considered. The in-situ environment wherein the fluid is administered includes, separately or in combination, soil in the groundwater unsaturated zone, the capillary fringe, soil and groundwater of the water saturated subsurface, and groundwater in the bedrock. The preferred embodiment treats subsets of the entire contaminated volume by administering small volumes of reagent fluid in a plurality of injection points. The slow application of the reagent is necessary to avoid saturating the immediate area around the injection point, which may prevent the ground from further absorbing, and thus transporting, the reagent. When reagent is added too quickly, an annulus of treated soil surrounding the injection point is observed, with no further treatment beyond it. When too much reagent is added, surfacing reagent is observed near the injection point. Depending on the depth of the injection, reagent is added at a rate of 3-10 gallons/minute. This application methodology allows the treatment of subsets with fluid volumes sufficient to wet the media.

When used on an excavated site, the method according to one embodiment oversprays reagent solution onto the floor and walls of the excavation area with reagent in the amount of 0.25-2.0 gal/sq ft of the floor, preferably 0.5-1.5 gal/sq ft. If the floor is fractured bedrock, 1.0-4.0 gal/sq ft is used, as it is envisioned that much of the reagent will enter the fracture. Following this step, the site may be further treated by using the injection method discussed above.

Reagent may be added in two stages; first through injections spaced equally apart, or by spraying the area to be treated, and then more direct injections in the area known to contain more contaminants, through use of a site characterization tool. It is believed that the first set of injections over a wider area assist in opening up the soil matrix to allow reagent to diffuse through the soil, thus making subsequent injections directly into a known center of contamination more effective. Furthermore, the injections can be dosed sufficiently to remediate the specific contaminant levels known to occur at that location. Another technique discussed above is to follow the locations where $CO_2$ bubbles or off-gases have risen to the top of the treatment area, to understand which locations within the treatment area have already been treated by the reagent. Future injections can then be spaced appropriately to reach those contaminated areas not yet treated by reagent.

Advantages of Various Embodiments of the Present Invention

Various embodiments of the present invention have a number of advantages over the prior art. They do not require long-term operation, maintenance, and monitoring. Certain exemplary methods utilize a single reagent fluid, unlike conventional technologies which instead use multiple reagent fluids. Various embodiments greatly increase the ability of the reagents to penetrate the media and contact the contaminant by controlling the rate at which the reagent generates the oxidizing and reducing components. A unique and important feature of this process with regard to the remediation of halogenated organic compounds, is that because the rate mechanism is driven by the concentration of substrate and the availability of hydroxide ion (nucleophile), it can directly destroy free phase halogenated compounds. In such cases, These concentrations of contaminant are greater than the toxic threshold of microbes therefore, anaerobic dechlorination (biological treatment) cannot proceed.

Further, the application of a dilute aqueous reagent fluid greatly increases the safety of the technology. Various embodiments provide the ability to control the rate of the chemical reactions during treatment, thereby minimizing or eliminating the heat generated by conventional technologies, and thus assuring that contaminants are not volatilized during the treatment. Various embodiments also eliminate the need for pretreatment of the subsurface media with acid and/or a metal catalyst as is required by the current technology. Various embodiments produce an abundance of calcium and/or magnesium cations that remain in solution for a time necessary to treat and reduce sodicity effect in sodic soils while simultaneously mitigating commingled organic contaminants. Various embodiments combine all compounds into a single formulation necessary to oxidize and/or reduce organic contaminants as well as simultaneously treating sodic soils.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

EXAMPLES

Example 1

A field test was conducted to remediate a former commercial dry cleaning site contaminated with Stoddard Solvent and tetrachloroethylene (TCE). The study site was delineated to include an area of approximately 24,625 square feet with a vertical treatment from surface to forty (40) feet (approximately 36,480 cubic yards). The soil consisted predominately of clay interbedded with sand stringers at varying depths. The treatment included delivering approximately seven (7) gallons per cubic yard of reagent employing a dual action rotary mixer to a depth of fifteen (15) feet and a DPT probe from Fifteen (15) to forty (40) feet to contact contaminants affecting soil and perched groundwater. The injection point spacing was seven (7) feet. The reagent fluid consisted of the following groups of reagents:

a) The remedial agents (oxidizing and reducing moieties) were calcium peroxide and hydrogen peroxide with a potential maximum hydrogen peroxide evolution of approximately 2.5 moles per liter of reagent fluid.

b) Acidic polyaminopolycarboxylate chelates at a total chelate concentration of approximately one (1) mole per liter.

c) Urea phosphate was added as needed, in amounts sufficient to adjust the reagent pH to 8.

Prior to the application events samples were collected and analyzed for contaminant concentrations to establish baseline data benchmarks. Sixty days post treatment samples were collected from the same points as the baseline samples. The results are shown in Table 2 below.

TABLE 2

| Contaminant* | Pre-application | Post-application | % Reduction |
|---|---|---|---|
| Ethylbenzene | 400 | 3.0 | 99.25 |
| Trimethylbenzene | 25,000 | 2.9 | 99.98 |
| TCE (1) | 650,000 | 3.0 | 99.99 |
| TCE (2) | 63,000 | 1,700 | 97.30 |
| TCE (3) | 460,000 | 3.0 | 99.99 |

TABLE 2-continued

| Contaminant* | Pre-application | Post-application | % Reduction |
|---|---|---|---|
| TCE (4) | 1,900 | 72 | 96.21 |
| Vinyl Chloride | 350 | 4.1 | 98.83 |

*Contaminant concentration expressed as μgm/Kg soil
TCE is tetrachloroethene

Example 2

Soil samples were collected from eleven (11) natural gas producing well sites to investigate the potential of an embodiment of the present invention for remediating hydrocarbon contaminants as well as reducing the Sodicity (SAR) effects from produced water (brine) released at the drilling sites. The samples were individually mixed to homogeneous state and divided into 500 g aliquots. Each sample was treated with 250 ml of the invention and allowed to react for two weeks. During the reaction time the acidity was maintain by addition of a phosphate buffer to maintain a pH of 8. The reagent fluid consisted of the following groups of reagents:

a) The remedial agents (oxidizing and reducing moieties) were calcium peroxide and hydrogen peroxide with a potential maximum hydrogen peroxide evolution of approximately 3.0 moles per liter of reagent fluid.
b) Acidic polyaminopolycarboxylate chelates at a total chelate concentration of approximately one to 1.5 (1 to 1.5) moles per liter.
c) Urea phosphate and ammonium phosphate buffer was added as needed, in amounts sufficient to adjust the reagent pH acidity to 8.

Table 3 contains comparative results before and after treatment in eleven different wells; the samples taken on Feb. 24, 2011 were before treatment, while the samples from Apr. 28, 2011 were measured after treatment. The percent reduction in contaminant concentration was calculated from the measured values in each well. In addition, SAR values were measured for each sample.

TABLE 3

Samples from Eleven Well Sites

| | | Benzene* | E-Benz* | Toluene* | Xylenes* | TRPH** | SAR*** |
|---|---|---|---|---|---|---|---|
| 1 | Feb. 24, 2011 | 68.5 | ND | 154 | 291 | 58.7 | 76.6 |
|   | Apr. 28, 2011 | 9.6 | ND | 26.3 | 104 | 12.6 | 8.1 |
|   | % Rdn. | 86.0 | | 82.9 | 64.3 | 78.5 | |
| 2 | Feb. 24, 2011 | ND | ND | ND | 151 | 2530 | 57.3 |
|   | Apr. 28, 2011 | ND | ND | ND | 36.2 | 167 | 8.4 |
|   | % Rdn. | | | | 76.0 | 93.4 | |
| 3 | Feb. 24, 2011 | ND | ND | ND | ND | ND | 23.3 |
|   | Apr. 28, 2011 | ND | ND | ND | ND | ND | 4.1 |
|   | % Rdn. | | | | | | |
| 4 | Feb. 24, 2011 | 577 | 228 | 2,580 | 159,000 | 83600 | 91.2 |
|   | Apr. 28, 2011 | 28.6 | 47.4 | 296 | 36,006 | 1243 | 7.6 |
|   | % Rdn. | 95.0 | 79.2 | 88.5 | 77.4 | 98.5 | |
| 5 | Feb. 24, 2011 | 161 | ND | 226 | 264 | 48800 | 10.9 |
|   | Apr. 28, 2011 | 19.3 | ND | 164 | 26.4 | 968 | 1 |
|   | % Rdn. | 88.0 | | 27.4 | 90.0 | 98.0 | |
| 6 | Feb. 24, 2011 | 2340 | 9550 | 90200 | 576000 | 344 | 2.1 |
|   | Apr. 28, 2011 | 26.4 | 1121 | 8646 | 106660 | 47 | 1 |
|   | % Rdn. | 98.9 | 88.3 | 90.4 | 81.5 | 86.3 | |
| 7 | Feb. 24, 2011 | ND | ND | ND | ND | 796 | 4 |
|   | Apr. 28, 2011 | ND | ND | ND | ND | 94 | 1 |
|   | % Rdn. | | | | | 88.2 | |
| 8 | Feb. 24, 2011 | ND | ND | 121 | 1510 | 3330 | 78 |
|   | Apr. 28, 2011 | ND | ND | 12 | 463 | 846 | 6.1 |
|   | % Rdn. | | | 90.1 | 69.3 | 74.6 | |
| 9 | Feb. 24, 2011 | ND | ND | ND | 247 | 158 | 29.6 |
|   | Apr. 28, 2011 | ND | ND | ND | 67 | 9 | 8 |
|   | % Rdn. | | | | 72.9 | 94.3 | |
| 10 | Feb. 24, 2011 | 98.6 | ND | 84.2 | ND | 199 | 2 |
|   | Apr. 28, 2011 | 21.3 | ND | 56.2 | ND | 21 | 1 |
|   | % Rdn. | 78.4 | | 33.3 | | 89.4 | |
| 11 | Feb. 24, 2011 | 87,000 | 34300 | 644000 | 2830000 | 227000 | 130.6 |
|   | Apr. 28, 2011 | 168.6 | 2600 | 10964 | 650120 | 71000 | 14 |
|   | % Rdn. | 99.8 | 92.4 | 98.3 | 77.0 | 68.7 | |

*Concentrations μgm/Kg
**Concentrations mg/Kg
***Regulatory Target Level = 12

The objective was to determine if an embodiment of the invention could effectively reduce the concentrations of contaminants and the SAR. The results indicate that the invention worked well based upon the volume of reagent applied. In actual field applications, more completed reductions can be enjoyed by applying a greater quantity of reagent. Results from this treatability study indicate that the invention was effective in treating the target pollutants.

Example 3

A field test was conducted to remediate a natural gas production site (well site) affected with hydrocarbons and suspected salt brine (sodicity) originating from well drilling and production releases to the environment. Historical data indicated that the target hydrocarbon pollutants exceeded Colorado Oil & Gas Conservation Commission (COGCC) maximum contaminant concentration levels (MCL) for soil and groundwater. The objectives of the application of the invention were: 1) to exploit the characteristic of the process to produce carbon dioxide (from the reaction of the reagent with hydrocarbons) which causes the evolution of foam from the injection points where contaminant sources are present in the soil, and thereby reveal the location of contaminant sources in the subsurface; 2) to concentrate the application of the invention in the area; and 3) to reduce the concentrations of hydrocarbon pollutants and sodicity to less than regulated levels (on well sites the hydrocarbons and sodic contaminants are usually commingled).

Over the course of a few weeks, an embodiment was tested for remediation of soil and groundwater effects located on the Site. The application was completed using a self contained mixing and pumping system in conjunction with a direct push rig. The reagent was injected at the Site on a 6.5 to 7 foot grid over the treated. At each injection location, the reagent was injected into the subsurface soils and into the groundwater smear zone concurrently by injecting the solution deeper in the subsurface soils to a level below the historic groundwater level or to an approximate maximum depth of 40 ft-bgs. The intensity of the reactions were most noticeable in the area of separator and beneath area of the former water tanks in the tank battery area. The reactions showed generally that the effects were more noticeable at a depth of approximately 21 ft-bgs to approximately 32 ft-bgs or within the depth of the historic groundwater.

Preliminary groundwater conditions after the treatment showed decreased concentrations of hydrocarbons to below COGCC standards, SAR and EC below COGCC standards Prior to conducting the test, surface soil samples were collected for the purpose of assessing background soil concentrations in the area of the Site for use in establishing remediation clean up criteria for the Site. Three discrete soil samples were collected from undisturbed areas around the Site. In addition to cation analysis, the samples were analyzed for Sodium Absorption Ratio (SAR). The results of these analyses indicated that SAR varied from 0.29 to 3.3. Although historical SAR levels were below the MCL of 12, the post treatment data revealed a significant decrease in SAR.

Table 4 compares measurements of certain contaminants before and after treatment, from four different sampling points. Also listed are the maximum contaminant concentration levels, or the regulatory target levels for each contaminant and SAR. The measurements taken before treatment were often above the allowed concentration levels, while they were all well below the regulatory levels after treatment.

TABLE 4

| | | Benzene* | E-Benz* | Toluene* | Xylenes* | TRPH* | SAR** |
|---|---|---|---|---|---|---|---|
| | Standard | 0.17 | 100 | 85 | 175 | 500 | 12 |
| 1 | Previous | 0.22 | 146 | 154 | 291 | 7810 | 6.91 |
| | Apr. 18, 2011 | <0.004 | <0.004 | <0.004 | 124 | <100 | 1.82 |
| 2 | Previous | 0.136 | 5.39 | 66 | 151 | 590 | |
| | Apr. 18, 2011 | <0.004 | <0.004 | <0.004 | 108 | <100 | |
| 3 | Previous | 0.298 | 221 | 193 | 74 | 2285 | |
| | Apr. 18, 2011 | <0.004 | <0.004 | <0.004 | 36 | <100 | |
| 4 | Previous | 0.157 | 164 | 71 | 109 | 1744 | |
| | Apr. 18, 2011 | <0.004 | <0.004 | <0.004 | 48 | <100 | |

Samples from Four Sampling Points

*Concentrations mg/Kg
**Regulatory Target Level = 12 (one composite sample collected)

Example 4

Soil was collected that was contaminated with SAR, perchloroethylene ("PCE"), and hydrocarbons to test the effect of the invention on remediating these compounds.

Approximately 2 L of contaminated soil were received by the laboratory. The soil was placed in a closed mixer to reduce volatilization of the BTEX and chlorinated VOC contaminants. The slurry reactors had a closed lid through which a mechanical mixture was fitted, and through which effluent gases were passed through a series of two powdered activated carbon (PAC) traps in series. The PAC traps were present to quantify the degree of volatilization of the VOCs. The PAC traps remove any PCE volatiles before such volatiles could reach the base traps. The homogenized soil was split into two aliquots of one liter each and placed into two different 2.5 L slurry reactors. One liter of DI water was placed in each reactor. Reactor one was used as a control while reactor to contained a 2% hydrogen peroxide solution with four parts calcium peroxide and one part of a 50-50 blend of EDTA and DTPA. The dose of solid additives (i.e., calcium peroxide and chelates) was 100 g per kilogram of soil solids. Ammonium phosphate was added as a buffer to the system. This was introduced rather than sodium or potassium phosphate salts so as not to impact the SAR measurements. It should be noted that although the contaminant concentrations are reported as mg/Kg in Table 4 below, whole slurry samples (i.e., water and soil) were taken and extracted for the contaminant analysis. This means in all phases and the reactor were tested, so that a complete mass balance could be performed.

Table 5 below lists the results for the control and invention reactors after six days. Also listed is the overall percentage contaminant reductions in the invention reactor, and the percent of the overall removal due to stripping is measured in the PAC traps.

TABLE 5

| Contaminant | Dry weight | Control Reactor | Invention Reactor | Percent removal | Percent due to Stripping |
|---|---|---|---|---|---|
| pH | 8.8 | 8.8 | 9.2 | | |
| SAR | 98.2 | 98.2 | 8.3 | 91.4% | |
| PCE (µg/kg) | 2,320 | 2420 | 150 | 93.5% | 1.2% |
| Benzene (µg/kg) | 1150 | 1150 | 180 | 84.3% | 0.8% |

TABLE 5-continued

| Contaminant | Dry weight | Control Reactor | Invention Reactor | Percent removal | Percent due to Stripping |
|---|---|---|---|---|---|
| Toluene (µg/kg) | 5550 | 5550 | 470 | 91.5% | 1.5% |
| Ethylbenzene (µg/kg) | 36,500 | 34,500 | 5000 | 86.3% | 2.1% |
| Xylenes (µg/kg) | 232,000 | 211,000 | 22,000 | 90.5% | 1.5% |
| TPH (mg/kg). | 36,500 | 36,500 | 2300 | 93.7% | 0.0% |

The results of Example 4 indicate that the invention worked well to treat SAR, hydrocarbons, and the chlorinated solvents included in this example.

Example 5

Example 5 was conducted to assess the conversion of the chlorinated solvent tetrachloroethylene (PCE) to carbon dioxide by the substitution nucleophilic ($S_N$) mechanism enunciated in the invention. In this demonstration, radioactive carbon-14 ($^{14}C$) isotope labeled PCE was used as a base substrate. During the reaction, the PCE was converted to carbon dioxide and chloride ion. The radioactive carbon dioxide ($^{14}C$—$CO_2$) was captured and compared to the concentrations of the carbon-14 labeled PCE prior to the reaction.

Erlenmeyer flasks with a stopper fitted with two PAC traps in series, followed by two Supelco carbon dioxide traps in series. The PAC traps removed any PCE volatiles before reaching the base traps. The carbon dioxide traps captured the carbon dioxide. Four reactors were set up. Reactor one was used as a control. Reactor two contained a solution of 2% hydrogen peroxide and 10% calcium peroxide. Reactors three and four contained a 2% hydrogen peroxide solution with four parts calcium peroxide and one part of a 50-50 blend of EDTA and DTPA. The results are shown below in Table 6.

TABLE 6

| Parameter | Reactor 1 | Reactor 2 | Reactor 3 | Reactor 4 |
|---|---|---|---|---|
| Total PCE Removal (%) | 4.1 | 12.6 | 99.4 | 97.7 |
| Volatile PCE Removal (%) | 4.4 | 11.3 | 5.3 | 6.1 |
| PCE Oxidized (%)* | 0.0 | 1.3 | 94.1 | 91.6 |
| Recovery of Cl⁻ (%) | N/A** | N/A** | 96.7 | 98.5 |
| Recovery of $^{14}C$—$CO_2$ (%) | N/A** | N/A** | 94.8 | 95.5 |

*Calculated as the difference between total and volatile PCE removal.
**N/A = not applicable, because there was no Cl⁻ or $^{14}C$—$CO_2$ detected.

What is claimed is:

1. A method of reducing sodicity in soil or clay, the soil or clay having an initial sodicity above a predetermined acceptable level as measured by the sodium adsorption ratio (SAR) of the soil or clay, and the soil or clay containing organic contaminants and a metal compound, the method comprising:
   (a) treating the soil or clay with an effective amount of an alkaline aqueous solution having a pH of at least 7 and comprising an alkaline buffering agent, calcium and/or magnesium peroxide, and a chelating agent, for a time sufficient to have the chelating agent chelate the metal of the metal compound;
   (b) reacting the calcium and/or magnesium peroxide with water to produce calcium and/or magnesium cations;
   (c) penetrating the soil or clay with gasses to diffuse the alkaline aqueous solution into the soil or clay and generate additional reaction; and
   (d) contacting the soil or clay with the alkaline aqueous solution for a time sufficient to cause the chelating agent to chelate the calcium and/or magnesium cations produced in step (b) and hold them in solution, the chelating agent chelating a sufficient amount of the calcium and/or magnesium cations in order to cause sodium cations to become dislodged from a matrix of the soil or clay into solution and to reduce the sodicity as measured by the sodium adsorption ratio of the soil or clay below the predetermined acceptable level.

2. The method of claim 1, wherein the concentration of peroxide is about 0.6 to about 4.5 Moles/Liter.

3. The method of claim 1, wherein the concentration of chelating agents is about 0.03 to about 1.5 Moles/Liter.

4. The method of claim 1, wherein the concentration of alkaline buffering agent is about 0.5 to about 2.0 lbs/ gallon.

5. The method of claim 1, wherein the pH of the alkaline aqueous solution is between 7.0 and 10.0.

6. The method of claim 1, wherein the temperature of the ground water or subsurface media rises no more than 10.0 degrees F.

7. The method of claim 1, wherein treating the soil or clay with the effective amount of the alkaline aqueous solution comprises:
   spraying or injecting the alkaline aqueous solution over or into surface of the soil or clay to be treated and
   injecting the solution into areas of the soil or clay exhibiting higher concentrations of contaminants.

8. The method of claim 7, wherein the alkaline aqueous solution is sprayed onto a floor or wall of an excavated area, in the amount of 0.25 -2.0 gal/ sq. ft.

9. The method of claim 7, wherein the alkaline aqueous solution is injected at a rate of 3-10 gallons per minute.

10. The method of claim 1, wherein treating the soil or clay with the effective amount of the alkaline aqueous solution comprises injecting the alkaline aqueous solution into the soil or clay at a rate of 3-10 gallons per minute.

11. The method of claim 1, wherein the initial sodicity of the soil or clay is above 70 SAR and the predetermined acceptable level is 12 SAR.

12. The method of claim 1, wherein treating the soil or clay with the effective amount of the alkaline aqueous solution comprises:
   spraying or injecting the alkaline aqueous solution over or into a surface of the soil or clay to be treated;
   determining areas of the soil or clay not yet reached by the solution; and
   spraying or injecting the solution into the areas not yet reached by the solution.

13. The method of claim 12, wherein determining the areas not yet reached by the reagent comprises:
   observing the evolution of gasses at the surface; and
   identifying the areas not yet reached by the reagent as those areas known to be contaminated with the contaminant but that did not evolve gasses at the surface.

14. A method of reducing sodicity and decontaminating soil or clay, the soil or clay having an initial sodicity above a predetermined acceptable level as measured by the sodium adsorption ratio (SAR) of the soil or clay, and the soil or clay containing halogenated organic contaminants and a metal compound, the method comprising:
   (a) treating the soil or clay with an effective amount of an alkaline aqueous solution having a pH of at least 7 and comprising an alkaline buffering agent, calcium and/or magnesium peroxide, and a chelating agent, for a time sufficient to have the chelating agent chelate the metal of the metal compound present in the soil or clay;

(b) reacting the chelated metal with the peroxide to catalytically convert the peroxide to oxidizing agents and hydroxide ions;

(c) reacting the calcium and and/or magnesium peroxide with water to produce calcium and/or magnesium cations;

(d) penetrating the soil or clay with gasses to diffuse the alkaline aqueous solution into the soil or clay and generating additional reactions;

(e) contacting the halogenated organic contaminants in the soil or clay with hydroxide ions to convert the contaminants through nucleophilic substitution to environmentally safe, non-toxic compounds;

(f) contacting the soil or clay with the alkaline aqueous solution for a time sufficient to cause the chelating agent to chelate the calcium and/or magnesium cations produced in step (c) and hold them in solution, the chelating agent chelating a sufficient amount of the calcium and/or magnesium ions in order to cause the sodium cations to become dislodged from a matrix of the soil or clay into solution to reduce the sodicity as measured by the sodium adsorption ratio of the soil or clay below the predetermined acceptable level;

(g) observing the evolution of gasses at a surface of the soil or clay;

(i) identifying areas known to be contaminated with contaminants but that did not evolve gases at the surface as areas not yet reached by the solution; and (j) spraying or injecting the solution into the areas not yet reached by the the solution.

* * * * *